May 21, 1968    W. R. VAN SLYKE ETAL    3,384,310
METHOD OF TREATING METALLIFEROUS ORES
Filed Feb. 16, 1966      2 Sheets-Sheet 1

INVENTORS
WILLIAM R. VAN SLYKE,
& LOUIS J. ERCK
BY WATTS & FISHER
ATTORNEYS

INVENTORS
WILLIAM R. VAN SLYKE,
& LOUIS J. ERCK
BY WATTS & FISHER

ATTORNEYS

3,384,310
METHOD OF TREATING METALLIFEROUS ORES

William R. Van Slyke, Taconite, Minn., and Louis J. Erck, Ishpeming, Mich., assignors to The Cleveland-Cliffs Iron Company
Filed Feb. 16, 1966, Ser. No. 527,806
5 Claims. (Cl. 241—20)

This invention relates to a method of treating metalliferous ores. It is applicable to non-magnetic ores which are amenable to gravity concentration, as exemplified by heavy-media treatment, including iron ores from different localities and certain non-ferrous ores such as those of manganese, zinc and lead. It is particularly suited to use with non-magnetic iron ores of the Mesabi range type.

In the interest of brevity, this invention will be described as applied to a Mesabi type, non-magnetic iron ore, but it is to be understood that it may be applied to the other ores just mentioned without substantial change.

In the early days, blast furnaces were supplied with direct-shipping iron ore, that is, as it came from the mines, employing simple crushing only to reduce the larger pieces of ore in size.

The pieces ranged from about six inches down to and including fine material often less than 200 mesh in size. This ore was often sufficiently free from silica and other foreign materials to be charged into a blast furnace with little or no preparation. However, the presence of excessive amounts of ore fines in those ores provoked irregular gas diffusion patterns in the stock column of the blast furnace with resultant disruptions in the operation of the furnace, the formation of chimneys or channels in the stock, the expulsion of fine ore through the blast furnace top, and limitations on the production rate of pig iron.

Some of the problems traceable to the presence of fines in the blast furnace were overcome by screening out the fines and sintering them with, or without, the inclusion of other products including blast furnace dust, sludge from settling tanks, mill scale, coke fines and limestone.

The next major advance in the art was in converting the very fine concentrate particles from taconite plants into pellets which were sized within a narrow range, which had a higher iron content than was contained in the non-processed or crude ore, or even in the sintered material, and which had a higher number of iron units per cubic foot of stock volume in the blast furnace than was present in previous blast furnace burdens.

Pellets came into extensive use because of advantages they possessed over the crude ore despite their considerably higher processing costs and higher selling prices.

As the use of pellets and sinter increased, and as the supply of high grade crude ores decreased, the need increased for devising means by which to make available not only the remaining limited supply of high grade ores but also the vast quantities of lower grade ores. More than 2½ billion tons of iron ore have been shipped from the Mesabi Range. This tonnage is the sum of direct-shipping ore and "concentrates" that have been produced in and shipped from conventional Mesabi range gravity type concentrating plants. About 400 million tons of lower grade ore make up the remaining reserves of the Mesabi Range. To be reasonably competitive with pellets and sinter, these ores have to meet the demands of the steel industry as to range of size consist, iron content, and other specifications to be acceptable in modern blast furnace practice.

To meet those demands new methods of separating the iron rich and iron poor fractions had to be found.

The general method now in use to concentrate this type of iron bearing material is described below.

The crude ore that comes from the mine is screened to exclude the +4" pieces, which primarily consist of taconite and semi-taconite and which would not respond to treatment in a heavy media concentrating plant. These large pieces are stockpiled as possible future use material. The −4" portion is separated by screening into +2" and −2" portions. If the crude ore in the −4" +2" fraction is similar to the 4" portion, it is also rejected and added to the stockpiled +4" material. If the −4" +2" portion is representative of the "concentrating" type of ore, that is, ore containing iron rich and iron poor particles which could be concentrated by the conventional Mesabi Range gravity type concentrating plant to form a merchantable product, the −4" +2" portion is crushed to a nominal 2" top size, combined with the naturally occurring 2" material, and the combined materials are screened to form three fractions. The first fraction ranges between −2" and +½" in size, the second fraction ranging between −½" and +⅛" in size, and the third fraction is below −⅛" in size. The −⅛" fraction is concentrated in another manner, for example by the process of U.S. Patent No. 2,744,627, and is then sintered and sent to the blast furnace. Each of the other two fractions are separated into float and sink products by heavy media separators, and the sink products are combined and shipped as coarse ore concentrates.

In the prior heavy-media process, it was recognized that larger particles of substantially the same density as smaller particles sink in the heavy-media separator at a faster rate than the smaller particles. In order to increase the efficiency of separation in the entire size range from 2" to ⅛", it was normal practice to split the total heavy-media feed into two sizes, namely −2" +½" and −½" +⅛". The −2" +½" size fraction was sent to one heavy-media separator carrying a high specific gravity suspension, while the −½" +⅛" fraction was sent to another heavy-media separator, carrying a lower specific gravity suspension. The sink products of these two separations were combined and sent to the blast furnace as a coarse ore product. These combined products were not entirely satisfactory for blast furnace use when the specifications became more rigid because the size range was too wide and the silica content was too high.

While the required size range could have been met by crushing either the heavy media feed or the heavy media sink product, the iron content could not thereby have been significantly increased so as to meet the requirements.

We have discovered that new, unobvious, unexpected and economically quite valuable results may be obtained by the present invention. Stated succinctly, this invention comprises crushing and recycling the sink product from the higher gravity heavy media separator of the process described immediately hereinabove. That sink product which is derived from the said third portion having −2" +½" size is preferably crushed to −¾" but may be crushed even finer if desired.

The present invention provides a method which will in fact reduce the maximum size of particles to be treated in the conventional heavy-media process, will provide a combined heavy-media concentrate of lower silica content, will provide a heavy-media feed of more favorable concentrating characteristics, thus obtaining a greater weight recovery of the feed; will reject material initially which, if crushed, would yield a high silica component in the heavy-media concentrates; will enable the operator to treat crude ores successfully that previously had to be by-passed for the reason a merchantable product could not be produced by the conventional heavy-media process, and will produce a product competitive with pellets for present day blast furnace use.

The present invention will be better understood by those skilled in the art from the drawings forming a part of this specification in which.

Figure 1:
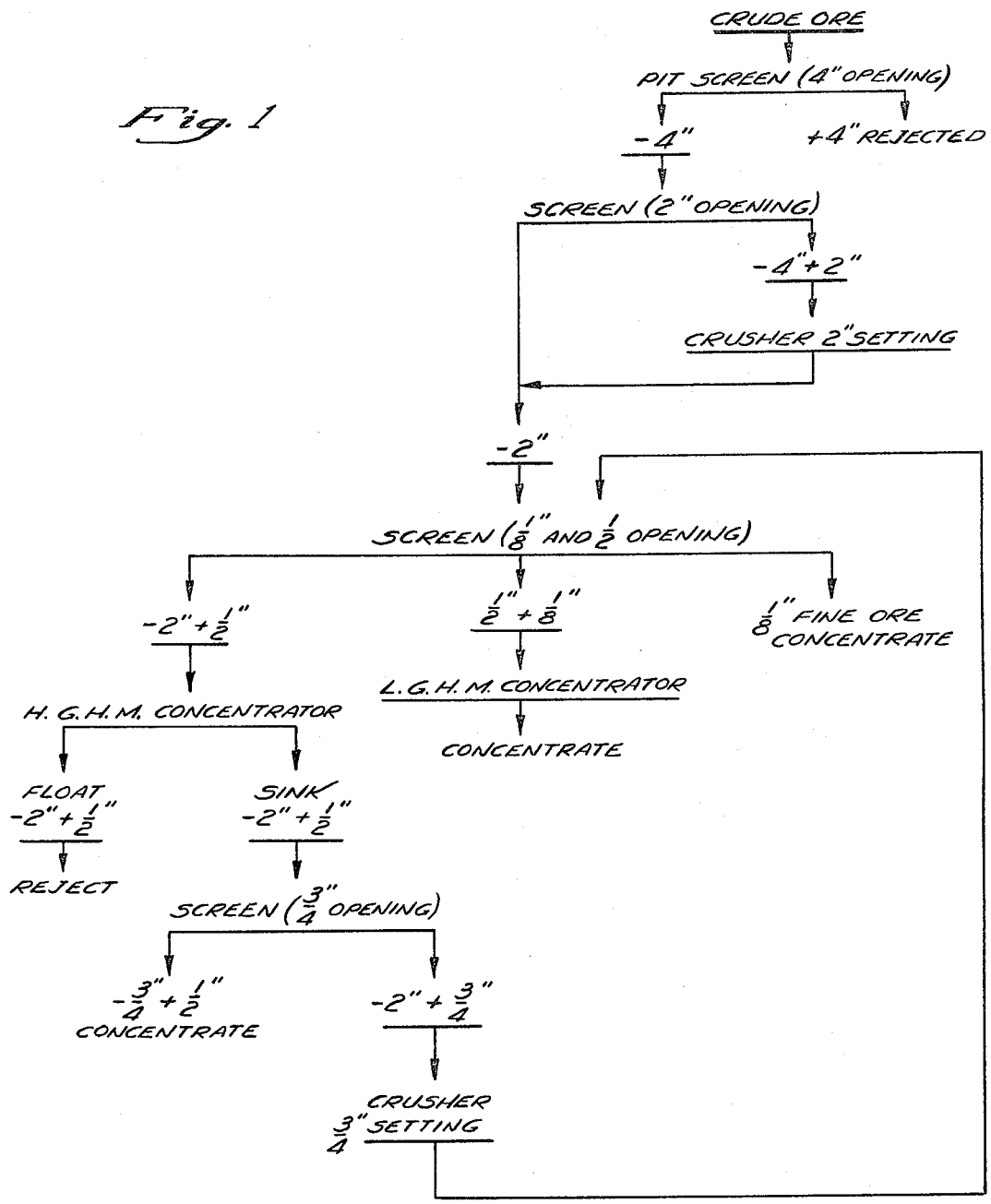
FIGURE 1 shows a flow diagram of a process embodying the present invention.

FIGURE 1 shows the steps of the present method in considerable detail. Crude non-magnetic iron ore of the Mesabi Range type is screened with a 4″ screen and the pieces which do not pass through the screen are rejected for possible future utilization. The pieces which do pass through the 4″ screen, that is, those which are −4″ in size, are screened on a cloth having 2″ openings. That part of the ore which does not pass through this screen is crushed to a nominal 2″ size and combined with the naturally occurring −2″ material except as noted in column 2, lines 5–8, inclusive. The nominal −2″ portion is screened preferably on cloths having ½″ openings and ⅛″ openings. The first fraction which passes through both screens consists of particles less than ⅛″ in size and these particles are beneficiated in any suitable conventional manner and, after sintering constitute an agglomerated product usable in a blast furnace. The second fraction which passes through the ½″ screen but does not pass through the ⅛″ screen, that is, which consists of particles −½″ +⅛″ in size, are subjected to low gravity heavy media separation and the sink product is a concentrate suitable for use in a blast furnace.

The third fraction which does not pass through the ½″ screen, that is which contains particles of −2″ +½″ in size, is subjected to higher gravity heavy media separation than that of the −½″ +⅛″ fraction. The resulting sink product is sized on a screen having ¾″ openings and the fraction which passes through that screen, that is, which consist of particles −¾″ +½″ in size, is a concentrate usable in a blast furnace. The fraction of the sink product which does not pass through the ¾″ screen, that is, which contains particles −2″ +¾″ in size, is crushed to reduce all the particles to less than ¾″ in size and these particles are returned to the screens where the original −2″ fraction is screened. The various sized particles passing through these screens are treated as just described above in connection with the −2″ fraction and added to previously obtained portions of the same particle sizes.

Figure 2:
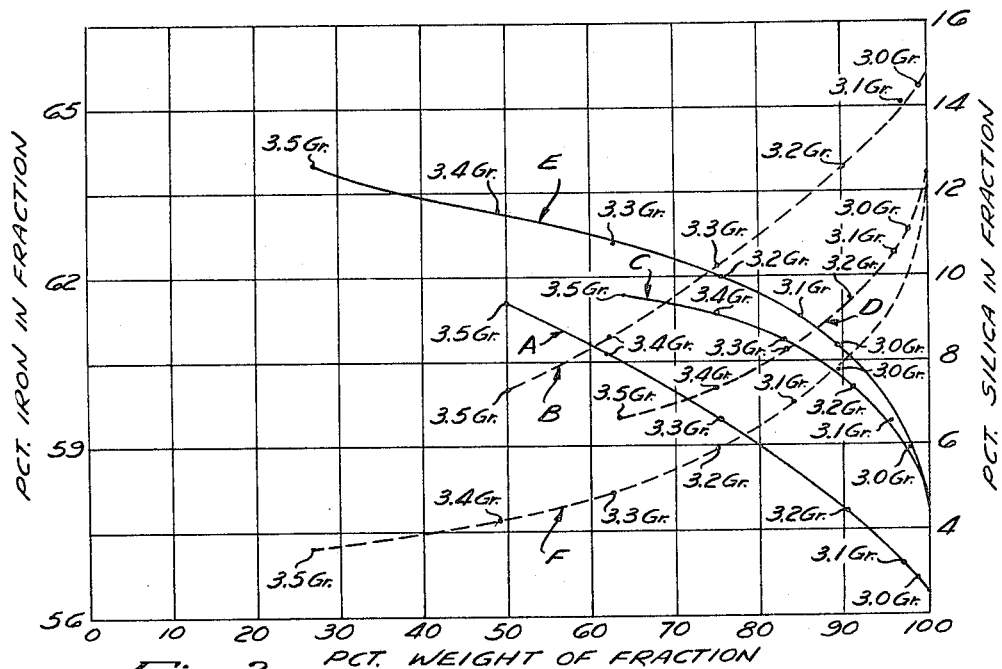
FIGURE 2 shows the iron and silica contents at various specific gravities in the crusher feed and in the various sized fractions of the crusher product produced by this invention.

The results obtained by carrying out this invention are shown graphically by FIGURE 2. In that figure, curve A shows the iron content in the crusher feed when it was subjected to heavy media separation using media having the gravities indicated by the figures on the curve. For example, at a gravity of 3.18 the iron content was about 57.90% found by interpolation and all the crusher feed assayed 56.45% as indicated at the lower end of curve A.

Similarly, curve B indicates the silica content in the crusher feed at the gravities of curve A. For example, at a gravity of 3.18 the silica content was 12.60% again found by interpolation and all the crusher feed assayed 14.80% as is indicated at the upper end of curve B.

Similarly, the iron and silica contents at each of the other gravities on curves A and B can be read off the scales at the left and right hand sides of the charge and the percent weight of the material separated can be read off the scale at the bottom of the chart.

Curves C and D correspond to curves A and B but are concerned with the +½″ crusher product.

Curves E and F correspond to curves A and B but are concerned with the −½″+⅛″ crusher product.

Figure 3:
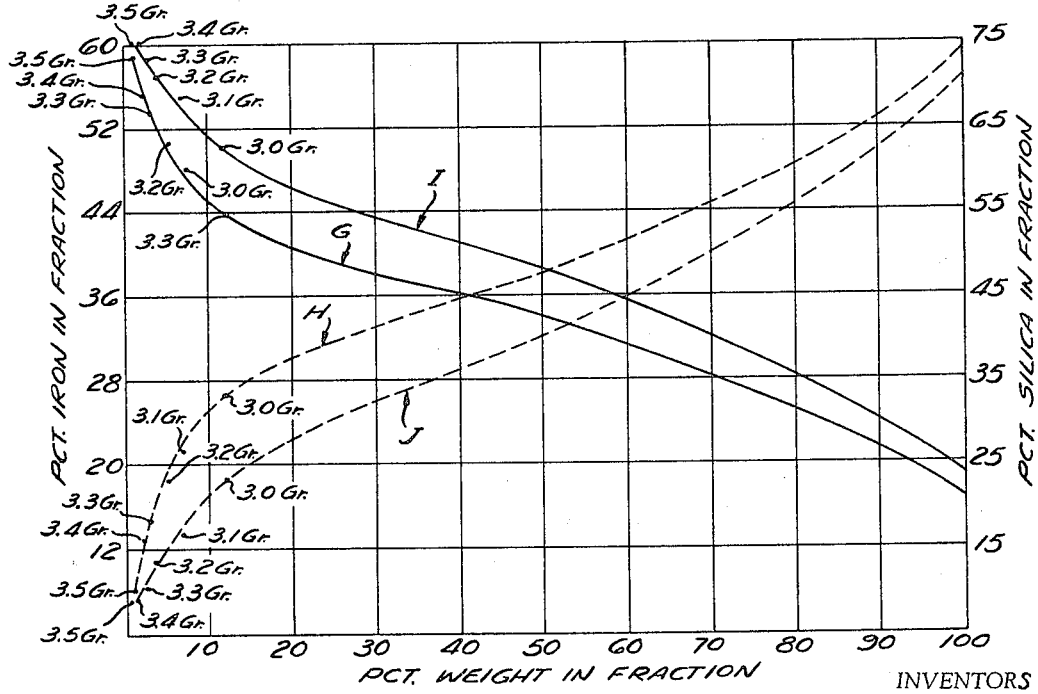
FIGURE 3 is similar to FIGURE 2 except that it relates to the float product.

FIGURE 3 shows graphically the iron and silica contents in the float product after crushing. Curve G shows the iron content of the +½″ crushed float at different gravities. For example, at a gravity of 3.18 the iron content was about 50% and the weight recovery was about 5½% also found by interpolation. Similarly, curve H shows that the silica content was 23.50% at the same gravity. The iron and silica contents and the weight percentages may be read off the left, right and bottom scales, as in the case of FIGURE 2.

Curves I and J are similar to curves G and H but are concerned with the −½″ +⅛″ crushed float material.

FIGURE 3 shows the amounts of iron and silica which would have been present in the sink product of FIGURE 2 if all the material fed to the heavier gravity separator had been crushed before being separated.

It will be understood that new, unobvious and unexpected results and marked economies are realized by this invention.

The present method makes it possible to meet both the present size and iron content requirements even with ores which had been left behind in mining operations because a merchantable product could not be produced therefrom by conventional heavy media separation.

The savings realizable by crushing only the −2″ +¾″ iron rich sink product from the high gravity media separator, as compared with crushing the entire −2″ +¾″ fraction of the ore fed into that separator, is indicated by the following example. It was found that 151 long tons per hour (l.t.p.h.) of the −2″ +¾″ fraction ore fed into the heavy media separator contained only 43 l.t.p.h. of the −2″ +¾″ sink product from that separator. This saving of 108 l.t.p.h., or 72% of the total material to be crushed, makes no alowance for the circulating load which was present. If the amount of that circulating load were taken into account, the comparable figure would be 43 l.t.p.h. and 178 l.t.p.h. which represents a reduction of 76% in tonnage to be crushed.

The conventional heavy media separation method consists of a one-pass system which means there is only one opportunity to separate the entire amount of near gravity material from the heavy particles that sink in the separating media. Since a perfect separation is virtually impossible to attain in a one-pass system, particularly when there is substantial quantity of near gravity particles present in the heavy media separator feed, a recirculation of the feed, particularly of the coarser size, offers an opportunity to improve the quality of the heavy media separation. Full scale plant tests (23 in number) have shown that about 8.22% of the material fed into the crusher and assaying about 42.84% of iron and about 35.52% of silica is material which appears in the sink product. Since the heavy media separator will eliminate about 90% of the float from the sink product in the first pass, it is believed that in the second pass about 90% of the remaining 8.22% of the material still present would be eliminated, thus producing a sink product containing only about 1% of that material.

Further evidence of the unexpected advantage of crushing only the −2″ +¾″ portion of the sink product from the heavy media separation, as contrasted with crushing all the −2″ +¾″ feed to the heavy media separator, is indicated in the following test results.

When the −2″ +¾″ fraction of the heavy-media concentrates is crushed and recycled through the heavy media plant, an average of the foregoing 23 tests showed that 88.67% of the weight of the crusher feed was recovered at the specific gravities then in use in the heavy-media plant. This material contained 58.82% Fe. and 9.74% Silica.

These figures compare with 100% of the crusher feed assaying 56.02% iron and 14.12% of silica which would have been a part of the concentrate had this novel procedure not been followed.

If the entire plus ¾″ fraction of the heavy media feed were crushed to pass ¾″, it is perfectly clear that that portion of the feed reporting as heavy-media reject, as well as that portion reporting as concentrates, would be crushed. It is thus evident that only the coarse (+¾″) fraction of the heavy-media concentrates can be crushed if improved chemical analysis of the resulting concentrates is to be achieved. That portion of the heavy-media feed reporting as a reject is so radically different in concentrating characteristics and produces such an inferior grade of sink product that, if anything, an inferior grade of overall concentrates would be produced, compared to the conventional process, if this +¾" heavy-media reject were not eliminated as a component of the crusher feed. Furthermore, the advantage of elimination of misplaced float material in the sink product, mentioned above, by reason of recycling would be lost and crusher requirements would be increased.

The overall grade of heavy media concentrates produced by crushing —2" heavy-media concentrates to pass ¾" and recycling according to this invention showed an average of 59.29% of iron and 9.03% of silica as contrasted with the prior art method of crushing only to pass 2", but not recycling, the concentrates assaying 58.61% of iron and 10.09% of silica.

Test data derived from a demonstration plant operating at commercial capacities clearly indicated that crude materials which were by-passed in normal operation of the prior conventional process could be satisfactorily processed when subjected to the screening, crushing and recycling systems of this invention. The chemical grade of concentrates obtained thereby from the previously non-treatable types of crude ore was acceptable for use in a blast furnace. The tests (23) showed that about 59% of the crude ore which was previously considered non-treatable by the conventional heavy-media process was converted by this invention into material suitable for use in a blast furnace. Thus, ores non-usable may be made usable and the existing estimates of reserves of treatable, non-magnetic ores by gravity means are greatly extended.

Any suitable heavy media may be used but preferably a conventional media is employed such, for example, as that disclosed in Reissue Patent No. 22,191, reissued Sept. 29, 1942, wherein the media includes a liquid and a ferro-silicon solid constituent in the form of particles whose coarsest sizes range between —65 to —100 mesh and contain in excess of about 75% by weight of iron.

Preferably, the higher gravity heavy media employed in the prior process in one of the separation units had a gravity ranging between about 3.30 and about 3.40, while the lower gravity heavy media had a gravity ranging between about 3.15 and about 3.20. However, the smaller particles, consisting largely of iron rich particles, sink slowly in this high gravity media and considerable quantities of these particles are discharged with the float product.

In contrast therewith, when the —2" +¾" sink product is crushed, a specific gravity range of 3.15 to 3.35 is used in the higher gravity separation and a range of 3.00 to 3.10 gravity range is used in the lower gravity separation, since the small particles of silica, by reason of being reduced in size by the crusher, do not require the heavier gravity to support them and the iron particles will settle more rapidly. Thus, a finer, more nearly complete separation of iron rich particles from the iron poor particles is obtained and the efficiency of the separation is increased.

Test results show the increased tonnage which may be produced by the present method as contrasted with the prior conventional methods. During the entire 1964 season when only the heavy media separations, without the crushing and recycling features, were employed 488,854 tons were fed to that heavy media plant and about 41% of that tonnage was recovered as concentrates. Between May 17 and Oct. 22, 1965, while the present method of operation embodying the crushing and recycling was employed, about 1,088,037 tons of ore was fed to the heavy media separator, and about 44% of that tonnage was recovered as concentrates.

The commercial significance of this invention is due to two factors, (1) the improved chemical analysis of the heavy-media concentrates, and (2) the improved weight recovery of the heavy-media plant feed by reason of being able to operate at a lower specific gravity. Dollar value of the improved grade is estimated at $73,173 in the current year. The value of the increased tonnage produced by reason of operating at lower specific gravities is estimated at $255,323, for a total of $328,496. Cost of operating the crusher, including depreciation, is estimated at $0.03/ton of total concentrates or $22,800, thus leaving a net increase in value of the product, after deducting increased operating costs, of $305,696. As long as a similar tonnage of heavy-media feed of similar concentrating characteristics is processed in succeeding years, there is every reason to assume that this annual saving will be duplicated in succeeding years. By contrast, the capital cost of this installation was approximately $127,000.

The iron content of the concentrates produced by the present method is between about 62% and about 64% when adjustments are made for ignition loss. The average iron contents of present day pellets fall within that range. As a result, concentrates prepared by the present method are competitive on the iron content basis with the present day pellets. The iron content of the product produced by this method contrasts strikingly with the 51.50% of natural iron content present in natural high grade ore which was satisfactory many years ago but is no longer satisfactory where high production rates, high top pressure in the blast furnace, high iron units per cubic foot of stock volume, and increased blowing rate of air are demanded by the steel industry.

As regards iron units per cubic foot of stock volume of bulk density, the product produced by the present method possesses an indicated bulk density of 125 pounds per cubic foot. This density is equal to or slightly higher than that of pellets now being produced and also of sinter agglomerates. The product of this method compares favorably in size with the pellet product for about 95% of the concentrates produced by the present method range in sizes between —¾" and +¼". These sizes compare favorably with pellets.

A so-called tumble test is in use for the purpose of determining the resistance of a product to degradation incident to transportation. A specific weight of the product in question, such as pellets or coarse ore, is placed in a coke tumble tester built according to ASTM specification, and rotated for a predetermined number of revolutions. The amount of fine material produced during the test measures the degree of degradation of the product. Concentrates produced by the present method compare favorably with commercially produced pellets and meet the specifications relating to degradation.

Iron ore products are now being tested under atmospheric and temperature conditions comparable to those present in a blast furnace to determine the extent to which the product breaks up in the furnace. This is important because fine materials in the stock column cause resistance to, and impede the flow of, gases up through the furnace and reduces the production rate of the furnace. Concentrates produced by the present method are comparable with various types of pellets when subjected to this test.

A test has also been developed to determine the degree to which ore materials for use in blast furnaces tend to swell when exposed to atmospheres containing up to 30% of carbon monoxide and 70% of nitrogen at a controlled temperature. Excessive increase in volume is undesirable because it has effects similar to an increase in the quantity of fines. Tests made on concentrates produced according to the present invention show that the concentrates actually shrink under the conditions of the test. When the ore particles were subjected to an oxidizing roast to eliminate the ignition loss and then tested, the results indicated an insignificant amount of swelling.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. The method of treating ores which comprises the steps of:
    (a) screening a metalliferous ore and separating it into a portion of large pieces and a portion of smaller pieces,
    (b) crushing the portion of smaller pieces to about −2″,
    (c) separating the combined crushed and naturally occurring portions to form at least a fraction of −2″ +½″ and another fraction of −½″,
    (d) concentrating the metal values of the −½″ fraction in a low gravity heavy media separator,
    (e) concentrating the metal values of the −2″ +½″ fraction in a higher gravity heavy media separator,
    (f) crushing the metal values from said higher gravity heavy media separator to about −¾″ and screening the crushed material and recycling it through the higher and lower gravity heavy media separators.

2. The method set forth in claim 1 in which the metalliferous ore is an iron ore amenable to gravity concentration.

3. The method set forth in claim 1 in which the metalliferous ore is a non-magnetic iron ore of the Mesabi Range type.

4. The method set forth in claim 1 in which the metalliferous ore is an iron ore amenable to gravity concentration and the said small pieces are separated into fractions of −2″ +½″, −½″ +⅛″ and −⅛″.

5. The method set forth in claim 4 in which the ore is a non-magnetic iron ore of the Mesabi Range type and is separated into a portion of +4″ pieces and a portion of −4″ pieces and the −½″ +⅛″ fraction and the −⅛″ fraction of the crushed metal values from the high gravity heavy media separator are added to the correspondingly sized fractions from the crushing of the said small pieces.

References Cited

UNITED STATES PATENTS

| | | | |
|---|---|---|---|
| 2,526,519 | 10/1950 | Vogel-Jorgensen | 209—17 XR |
| 2,744,627 | 5/1956 | Erck | 209—172.5 |
| 2,877,954 | 3/1959 | Myers | 241—24 |
| 3,337,328 | 8/1967 | Lawver | 241—24 XR |

WILLIAM W. DYER, JR., *Primary Examiner.*

W. D. BRAY, *Assistant Examiner.*